Jan. 27, 1942.   A. S. HARTANOV ET AL   2,271,481
MEAT CHILLING METHOD AND APPARATUS
Filed May 26, 1939
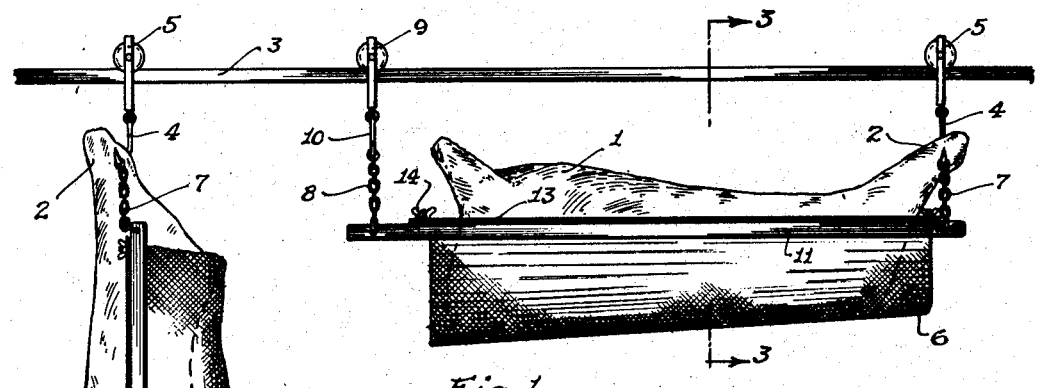
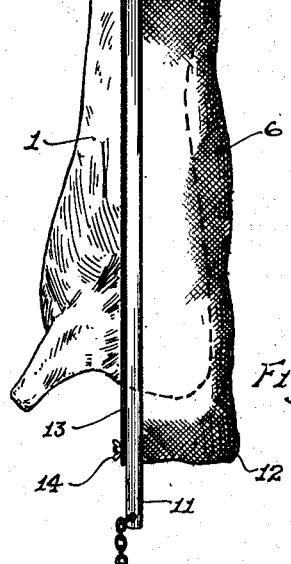
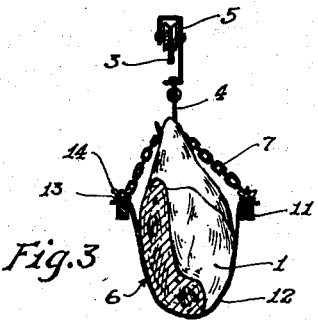
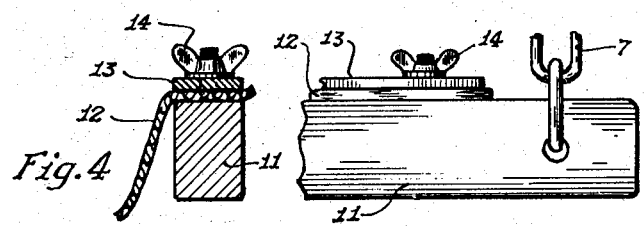
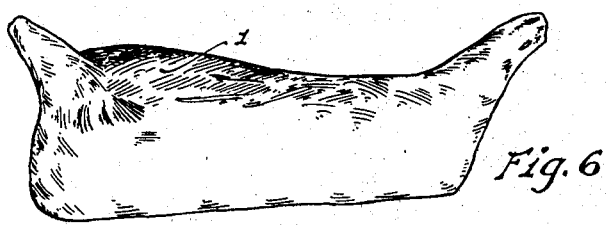
Andrew S. Hartanov and
Frank B. Bratek
INVENTOR
ATTEST:
George F. Mueller
Wm C. Meiser
BY
ATTORNEY Patented Jan. 27, 1942

2,271,481

UNITED STATES PATENT OFFICE 2,271,481

MEAT CHILLING METHOD AND APPARATUS

Andrew S. Hartanov and Frank B. Bratek, Chicago, Ill., assignors to Industrial Patents Corporation, Chicago, Ill., a corporation of Delaware Application May 26, 1939, Serial No. 275,863

10 Claims. (Cl. 62—114)

This invention relates to a method of and apparatus for preparing for market edible animal carcasses.

In the conventional practice of preparing animal carcasses for market, for example, a beef carcass, the carcass is dressed and split, and the halves or sides hung by one end, generally, the hind legs at the heel cords. The suspended sides are then transferred to a refrigerating chamber wherein they are chilled and become set. This practice results in the setting of the bone structure and flesh portions of the carcass or side in a strained or tensioned condition because the entire weight of the carcass or side is supported from a single point, the heel cord. This practice also results in a toughening of certain portions of the flesh of the carcass because certain muscle portions set while in a strained or stretched condition.

In Patents Nos. 1,719,030 and 1,724,006, it has been proposed to place the carcass or portions of the carcass on rigid racks or supports and adjust the position of the shanks so that the various portions of the carcass assume a position on the rack which corresponds closely to the relaxed or natural position. After the carcass is placed upon such rack, it is transferred to a refrigerated chamber, and the carcass becomes set in a relaxed or natural position. The use of the chilling racks involves additional handling of the carcass and presents serious sanitation problems.

One of the objects of our invention is to provide a method and means for supporting edible animal carcasses or portions of the carcass in a relaxed or substantially natural position during the chilling and setting period.

A further object of our invention is to provide means for supporting animal carcasses or portions of the carcass in a substantially natural position during the chilling and setting period which is simple in construction and which reduces the sanitation problem to a minimum.

Further objects and advantages of this invention will be apparent from the description and claims which follow.

Figure 1 is a side view illustrating a portion of a carcass supported in accordance with our invention.

Figure 2 is a side view showing a carcass supported by the heel cord prior to supporting the carcass in accordance with our invention.

Figure 3 is a sectional view of Figure 1 taken on line 3—3 thereof.

Figure 4 is an enlarged sectional view illustrating a detail of the supporting apparatus.

Figure 5 is an enlarged side view of one end of the supporting member of the apparatus.

Figure 6 is a side view of a portion of a carcass chilled and set in accordance with the present invention.

Figure 7 is a similar view of a similar portion of a carcass chilled and set by suspending the side from the heel cord in accordance with conventional practice.

The present invention contemplates supporting the carcass or a portion of a carcass along its back edge throughout its length in a flexible mold during the chilling period and while the carcass becomes set. For a better understanding of our invention, it will be illustrated by describing its practice with a side of beef, but it is to be understood that our invention is not limited to supporting only beef carcasses during chilling and setting.

In practicing our invention, a side of beef 1 is suspended by the heel cord of the hind shank 2 from rail 3 by means of a supporting member consisting of hook 4 and trolley 5. One end of a flexible mold or hammock 6 is supported from hook 4 by means of chain 7, as illustrated in Figure 2. The free end of hammock 6 is then raised into a substantially horizontal position and supported in such position by chains 8 from a supporting member consisting of trolley 9 and hook 10.

The hammock comprises a pair of bars 11 and a flexible sling 12. Chains 7 and 8 are secured to the bars adjacent the ends of the bars. The sling 12 forms a flexible mold and consists of preferably a heavy fabric, such as canvas, which is secured to bars 11, being clamped to the bars by clamping plates 13 and thumb screws 14. The canvas or heavy fabric may be readily removed from the bars and replaced by a fresh clean fabric by loosening thumb knots 14. After use the sling may be laundered and reused.

On raising the hammock and carcass from the position illustrated in Figure 2 into a substantially horizontal position, the carcass assumes a relaxed and substantially natural position, that is, the portions of the carcass assume a position which corresponds to the natural position occupied before the animal is slaughtered. The carcass is suspended by the heel cord and the hammock is raised to a substantially horizontal position while the carcass is warm and before the body heat has left the carcass. The carcass is then transferred to a refrigerating chamber where it is chilled and the muscle and bone structure becomes set.

Chilling and setting of a carcass by our method eliminates the usual arching or curvature of the back.

The set side of beef will approximate the form illustrated in Figure 6. Figure 7 illustrates the usual form of beef sides chilled and set while suspended from the heel cord of the hind shank in accordance with conventional practice.

Our invention provides a simple method for applying a support for the entire backbone or back side of a carcass during chilling and eliminates the usual arching or curvature of the back. The flexible support permits the carcass to assume a relaxed position and aids in shaping the fat surface of the carcass. Carcasses chilled in accordance with our invention have a plumper and a well filled out backbone section. The apparatus which is employed in the practice of our invention is simple and does not present a serious sanitation problem since the fabric may be readily removed and washed.

We claim:

1. The method of treating edible animal carcasses of the class of quadrupeds which normally become misshapen when suspended from the hind shanks which comprises supporting the carcass with its back side down along the back edge thereof in an open flexible mold while the carcass is warm and before the body heat has left the carcass, and thereafter chilling the carcass to set the structure.

2. The method of treating edible animal carcasses of the class of quadrupeds which normally become misshapen when suspended from the hind shanks which comprises supporting the carcass with its back side down along the back edge thereof in an open flexible mold and in substantially natural position while the carcass is warm and before the body heat has left the carcass, and thereafter chilling the carcass to set the structure.

3. The method of treating beef sides which comprises supporting the side in a flexible mold with its back side down while the side is warm and before the body heat has left the side, and thereafter chilling the side to set the structure.

4. The method of treating beef sides which comprises supporting the side in a flexible mold with its back side down and in substantially natural position while the side is warm and before the body heat has left the side, and thereafter chilling the side to set the structure.

5. Means for supporting the back portion of freshly killed edible carcasses and carcass sides in a substantially natural position and during chilling of the carcasses and sides comprising an open top flexible mold adapted to fit along the back edge of the carcass.

6. Means for supporting the back portion of freshly killed edible carcasses and carcass sides in a substantially natural position and during chilling of the carcasses and sides comprising a pair of bars and a sling secured to said bars.

7. Means for supporting the back portion of freshly killed edible carcasses and carcass sides in a substantially natural position and during chilling of the carcasses and sides comprising a pair of bars and a flexible sling secured removably to said bars.

8. Means for supporting the back portion of freshly killed edible carcasses and carcass sides in a substantially natural position and during chilling of the carcasses and sides comprising a pair of bars and a fabric sling secured removably to said bars.

9. Means for supporting the back portion of freshly killed edible carcasses and carcass sides in a substantially natural position and during chilling of the carcasses and sides comprising a pair of bars, a clamping plate removably secured to each of said bars, and a flexible sling removably secured to said bars.

10. Means for supporting the back portion of freshly killed edible carcasses and carcass sides in a substantially natural position and during chilling of the carcasses and sides comprising a pair of bars, a clamping plate removably secured to each of said bars, and a fabric sling removably secured to said bars.

ANDREW S. HARTANOV.
FRANK B. BRATEK.